Patented Aug. 14, 1923.

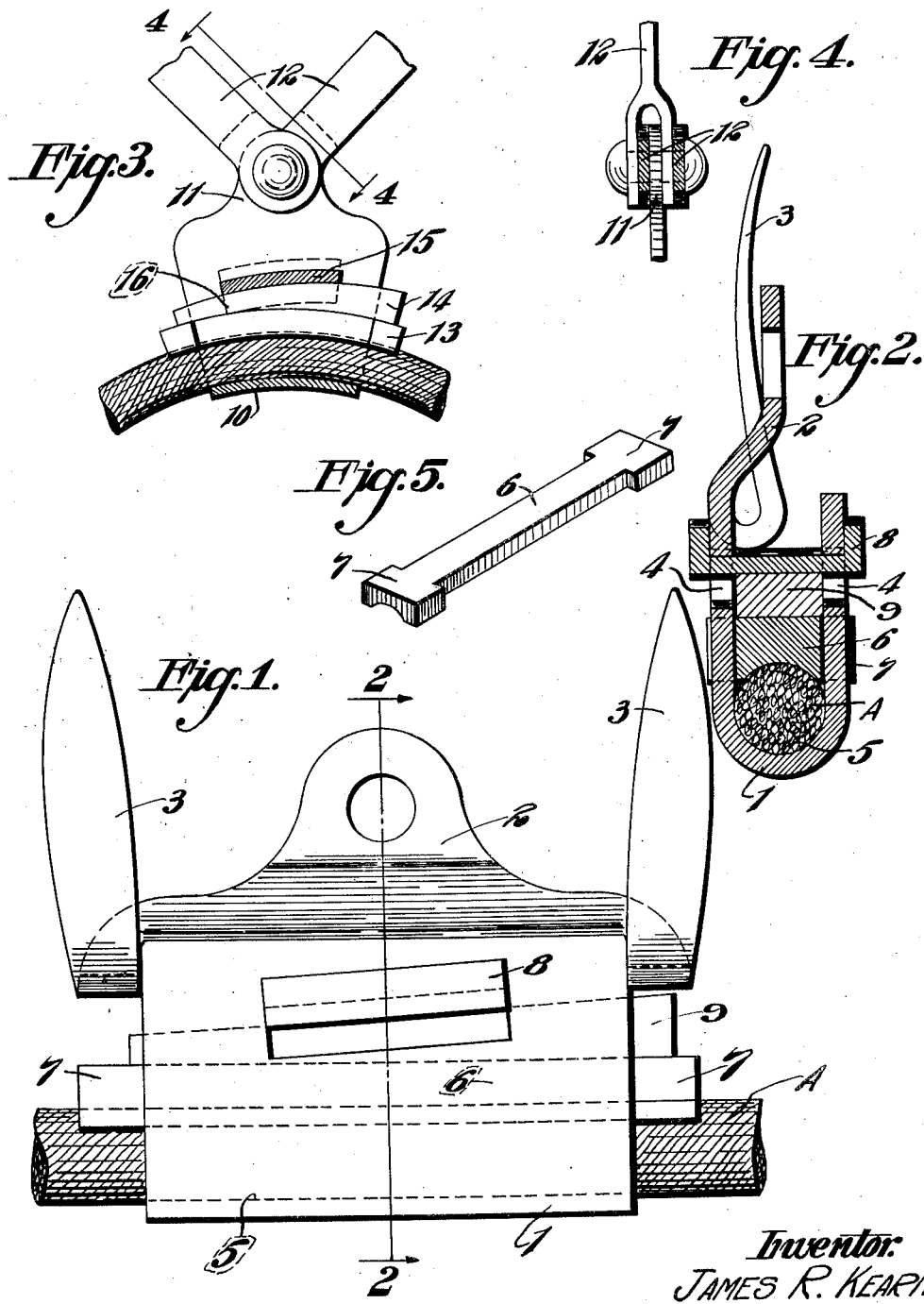

1,464,940

UNITED STATES PATENT OFFICE.

JAMES R. KEARNEY, OF KANSAS CITY, MISSOURI.

CABLE CLAMP.

Application filed August 18, 1922. Serial No. 582,802.

*To all whom it may concern:*

Be it known that I, JAMES R. KEARNEY, a citizen of the United States, residing at Kansas City, county of Jackson, and State of Missouri, have invented a certain new and useful Improvement in Cable Clamps, of which the following is a full, clear, and exact description, such as will enable others skilled in the art to which it appertains to make and use the same, reference being had to the accompanying drawings, forming part of this application.

My invention relates to clamps of the general type illustrated in Patent No. 1,365,411, issued to S. G. Kearney, January 11, 1921.

One object of my invention is to improve the clamp there shown by providing a bearing between the wire or cable secured by the clamp and the clamp wedge member. This eliminates injury to the wire or cable when the wedge is inserted and provides a more secure fastening for the wire or cable.

An object of my invention is to adapt my clamp for securing a cable whereby the latter is curved.

Another object of my invention is to provide in a clamp of this nature horn-gap elements adapted to cooperate with similar elements upon a transmission line suspension to serve as an arrestor of excess voltages such as resulting from lightning or other causes.

In the accompanying drawings which illustrate my invention,—

Figure 1 is a front elevation of my guy clamp showing a cable secured therein.

Figure 2 is a vertical transverse section on line 2—2 of Figure 1.

Figure 3 illustrates a clamp modified to fit a curved cable.

Figure 4 is a section and view taken on line 4—4 of Figure 2.

Figure 5 is an isometric detail of the wire bearing member.

The body of the clamp consists of a U-shaped sheet metal member 1, one of the upstanding wings of which forms a suspension ear 2, preferably positioned over the center of the concavity at the bottom of the body. Transverse cuts extending the entire length of the shorter wing of the body and extending a substantial distance up the longer wing form spaced tongues 3 which are bent as shown and form horn-gap elements extending upwardly beyond suspension ear 2.

Aligned slots 4 are formed in the parallel wings of the body and these slots are preferably inclined longitudinally relative to the supporting surface 5 at the bottom of the U-shaped body.

A wire bearing member 6 extends longitudinally of the body and has its ends 7 wide enough to engage the ends of the body while its sides between its ends are recessed to receive the upstanding wings of the body. The lower face of bearing 6 is concaved to fit over the surface of a wire or cable mounted in the clamp and the upper face of member 6 is flat.

Removably positioned in slots 4 is a channel-like members 8, the flanges of which are adapted to be inserted through slots 4 and when the member is raised as shown in the drawings to engage the outer faces of the body wings, this member 8 forms a bridge across the U-shaped body and forms an abutment member for a wedge 9 which is inserted in the space between bearing 6 and member 8 and serves to clamp the cable A between bearing 7 and the bottom 5 of the body.

It is obvious that the insertion of wedge 9 cannot injure the insulation forming the covering of cable A as bearing 7 which is in contact with the cable is held against longitudinal movement thereon by the engagement of its ends 7 with the ends of the body member. Weaving or twisting of the cable has no effect on the wedge and cannot loosen the clamp as a whole.

It will be understood that the clamp may be suspended from a pole cross arm through a series of insulators and the upper end of the insulator suspension may be provided with depending horn-gap elements aligned with tongues 3 and forming therewith a spark gap adapted to relieve excessive potential in the wire and prevent destruction of the insulator suspension.

The design shown in Figures 1 and 2 is especially adapted for vertical suspension of the cable A while in Figures 3 and 4 I show a construction which is especially adapted for a lateral guy and in which the bottom 10 of the U-shaped section is curved longitudinally of the body and the securing ear 11 is provided with pivoted clevis members 12 whereby guy wires may be attached and run to any convenient support. In this construction, bearing 13, wedge 14, and abutment 15 are all correspondingly curved so that the clamp will function similarly to the straight clamp.

The bottom surface of bearing 13 and the top surface of the bottom of body 10 are preferably concentric although allowance must be made for variations in the sizes of cable secured by the curved clamp. The opposite faces of the wedge 14 are eccentric of course and the upper edges of slots 16 are inclined relatively to the bottom of the clamp similar to the inclination of the straight upper edges of slots 4 in Figure 1.

In Figure 3 I omit the horn-gap tongues to more clearly illustrate the construction and it is likely that in many applications of the clamp these horn-gap elements will not be utilized but obviously they may be provided on the curved clamp as well as on the straight clamp.

Various modifications in the construction of my clamp may be made without departing from the spirit thereof as expressed in the appended claims.

I claim:

1. In a cable clamp, a body having upstanding wings provided with slots, an abutment member fitted in said slots, a wire engaging bearing, and a wedge element between said member and said bearing.

2. In a cable clamp, a U-shaped body provided with slots in its legs, an abutment member fitted in said slots, a wire engaging bearing having a U-shaped face, the concave portion of which opposes the concave portion of said body, and a wedge element between said element and bearing.

3. In a cable clamp, a U-shaped body provided with slots in its legs, an abutment member fitted in said slots and having a flat lower face, a wire engaging bearing having a flat upper face and an inverted U-shaped lower face, and a wedge element, having flat upper and lower faces, between said member and bearing.

4. In a cable clamp, a body having upstanding wings provided with slots, an abutment member fitted in said slots, a wire engaging bearing, a wedge element between said member and said bearing, and means preventing relative longitudinal movement of said body and bearing.

5. In a cable clamp, a body having parallel wings provided with aligned slots, a wire bearing slidable vertically in said body, having recessed sides receiving the body wings, an abutment member fitted in said slots and having limited upward movement therein, and a wedge element inserted between said bearing and member.

6. In a cable clamp, a body having parallel wings provided with aligned slots, a wire bearing slidable vertically between said wings but secured against longitudinal movement therein, an abutment detachably fitted in said slots but secured against longitudinal movement therein, and a wedge element inserted longitudinally between said bearing and member.

7. In a cable clamp, a body having a portion U-shaped in cross section, with its bottom curved longitudinally of its length, aligned slots in the side of said portion, a transverse abutment member fitted in said slots and having its lower face curved correspondingly to said curved body portion, a wire bearing curved concentrically with the bottom of said U-shaped body portion, and a wedge inserted between said member and bearing, having its upper and lower faces curved to correspond with the adjacent faces of said member and bearing, respectively.

8. In a cable suspension device, a U-shaped body, cable clamping means between the legs of said body, and horn gap elements formed integrally on one of the legs of said body.

9. In a cable suspension device, a U-shaped body having one leg which forms a suspension ear, horn gap elements formed by transverse cuts through said body and bent upwardly above said suspension ear, and cable clamping means between the legs of said body.

10. In a cable suspension device, a U-shaped body cut transversely near each end entirely through one leg and through a substantial portion of the other leg with the partially severed body portions thus formed bent upwardly to form spaced horn gap elements which extend above the remainder of the body.

In testimony whereof I hereunto affix my signature this 14th day of August, 1922.

JAMES R. KEARNEY.